Dec. 12, 1944. J. W. SMITH 2,364,827
EYE TESTING DEVICE
Filed Nov. 4, 1942
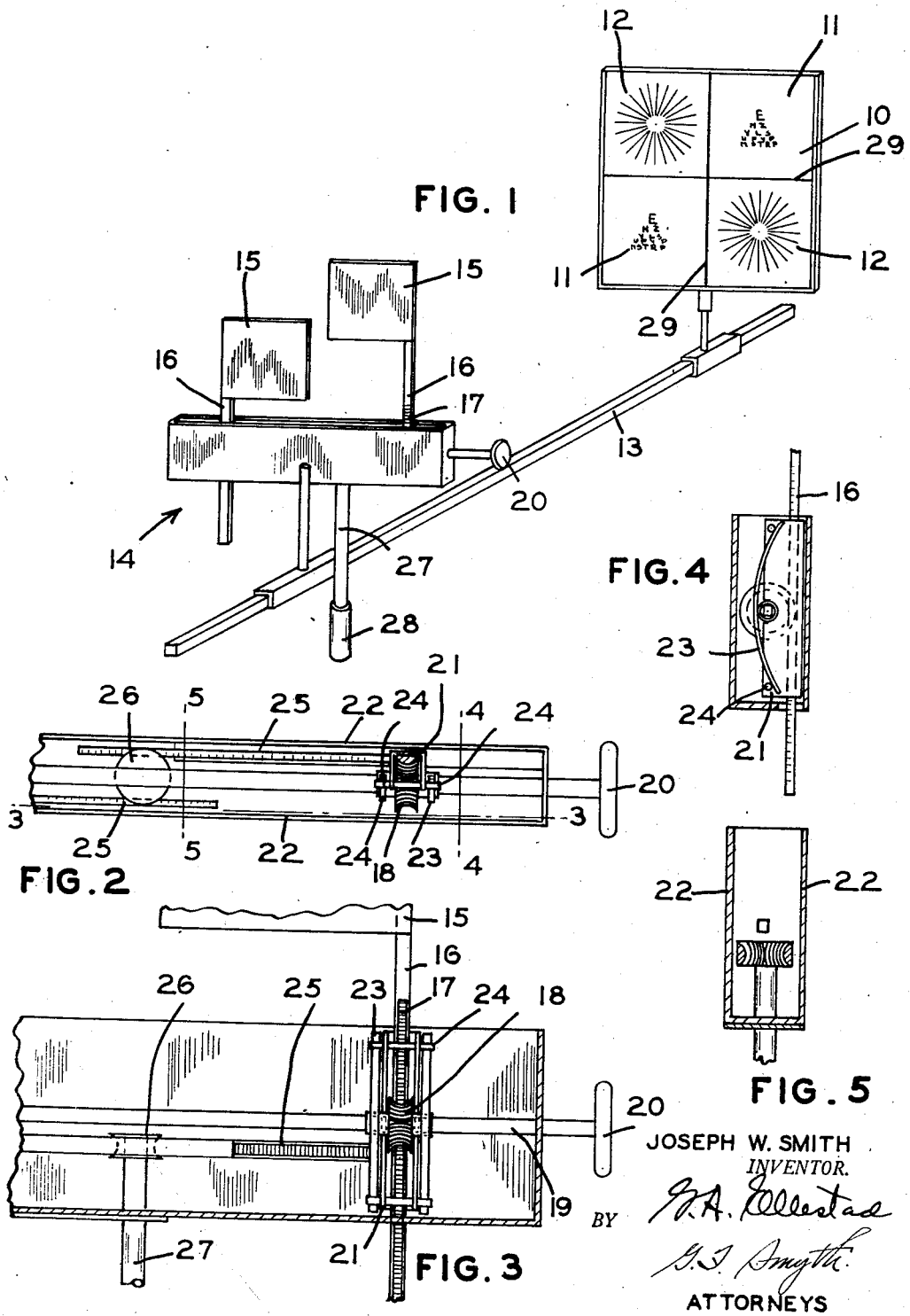
JOSEPH W. SMITH
INVENTOR.
ATTORNEYS Patented Dec. 12, 1944

2,364,827

UNITED STATES PATENT OFFICE 2,364,827

EYE-TESTING DEVICE

Joseph W. Smith, Cambridge, Ohio

Application November 4, 1942, Serial No. 464,473

6 Claims. (Cl. 88—20)

This invention relates to an apparatus for testing the eyes of a subject and more particularly, to an apparatus for detecting the state of the external ocular muscles and for determining the amount of the insufficiencies thereof.

The device of the present invention is adapted to allow both eyes to be refracted at the same time, and furthermore, the operator may keep the state of particular ocular muscles under observation during the entire test with lenses and prisms.

In the preferred embodiment of the device of the present invention, the test is made of the eyes of the patient by wholly retaining singleness of the test object or chart and unlike the usual type of test, the device preserves the similarity of the test image either in one or both eyes. The principle of the device of the present invention so far as it relates to the testing of the muscular imbalance is to present a separate image from each eye which may be carried along the nerve fibers to the brain, so that when united, a single image will be presented if the eyes are orthophoric. In cases, however, where the eyes are not in normal balance, the two images from the two eyes will not make a single image in the brain and the amount of such imbalance can be readily determined, as well as whether the imbalance is vertical or horizontal.

The device in the now preferred form comprises a test chart having duplicate sets of test objects in diagonally located corners or quarters with adjustable occluding means for causing opposite retinal halves of the respective eyes to view respective objects. The relative position of the occluding means may be varied, either horizontally or vertically, so that by adjusting the relative position of the occluding means, either horizontal or vertical retinal halves may be occluded.

As the occluding means are adjustable relative to each other, they may be adjusted to meet different interpupillary distances in different subjects, as well as different size macula lutea of the eyes of different subjects.

Other objects and advantages of the present invention will appear in the following description taken in connection with the accompanying drawing in which:

Fig. 1 is a perspective view of a testing apparatus embodied in the present invention.

Fig. 2 is a top plan view of substantially one-half of the carrier of the present invention showing the occluding plate arms in section.

Fig. 3 is a section taken along line 3—3 of Fig. 2.

Fig. 4 is a section taken along line 4—4 of Fig. 2.

Fig. 5 is a section taken along line 5—5 of Fig. 2.

As shown in Fig. 1 of the accompanying drawing, the device may consist of a test chart 10 having duplicate test characters 11 and 12 in diagonally opposite quarters thereof, which is used before the eyes of the subject being tested.

In the illustrated form of the device, a rod 13 is provided on which the chart can be mounted in a manner similar to the usual testing apparatus.

The bar 13 also supports a carrier 14 to which is mounted a pair of occluding devices 15, each comprising a substantially rectangular shaped plate painted black. In the preferred embodiment of the device of the present invention, each plate is mounted to the carrier 14 through an arm 16 carrying on one face thereof a rack 17 engaged and driven by a pinion 18 fixed to a rotating shaft 19. To facilitate adjustment of the shaft, the same carries at one end thereof an operating knob 20. The shaft 19 is journaled in bearing apertures formed in channel-shaped guides 21 in which the arms 16 operate, the guides being disposed against adjacent faces of the opposite walls 22 of the carrier 14 and held thereto by any means desired.

To hold the pinions in close engagement with the racks, each guide 21 carries a pair of leaf springs 23, the ends of which are fixed under pins 24, and the intermediate portions of which engage the shaft on opposite sides of the guide. The pair of leaf springs carried by one guide urges the shaft in the direction of one of the opposed walls 22 while the pair of springs carried by the other guide urges the shaft and the pinion carried thereby in the direction of the other wall 22.

In the preferred form of the device of the present invention, the pitch of each rack is opposite to that of the other and it will be seen that rotation of the shaft 19 will cause the pinions 18 to drive the racks in opposite directions. Accordingly, as one device moves upwardly, the other moves downwardly.

The occluding plates 15 in one use of the device of the present invention, are adjusted to bring the same into position in which the left-hand plate covers the lower half of the macula lutea of the left eye and the right-hand plate covers the upper half of the macula lutea of the right eye. Accordingly, in this position of the plates, the upper half of the test chart is viewed by the upper portion of the left eye and the lower half of the chart by the lower portion of the right eye. Since each eye sees only half of the chart, the sight center of the brain will unite the two portions from the two eyes and a single image will be the impression obtained, provided the eyes are orthophoric. If the eyes are not in normal balance, the upper half image will appear to be right of the lower half of the image in the case of esophoria and the upper half of the image will appear to the left of the lower half of the image in the case of exophoria.

To test for cases of hyperphoria or vertical imbalance, means are provided for horizontally adjusting the position of the plates 15 and in the now preferred form of the invention, this means comprises a rack 25 carried by each guide 21 and horizontally extending along the inner surface of each wall 22 and a driving pinion 26 carried by a shaft 27 extending vertically downward from the carrier 14. The shaft is provided with an operating knob 28 to facilitate the horizontal adjustment of the plates 15.

The examiner is therefore able by selective adjustment of the plates 15 to present to the right side of the macula of the right eye the left half of the chart, and to the left half of the macula of the left eye, the right half of the chart. If no vertical imbalance exists, the two halves of the object will be presented to the sight centers as one single image of the test chart. However, if right hyperphoria exists, the half image of the right eye will appear to the right side, but lower than the half image on the left, and in the case of left hyperphoria, the image of the left eye will appear on the left side but lower down than the image on the opposite side.

When the patient's eyes have been tested in this manner and it has been determined that any of the muscular imbalances are present, that is either esophoria or exophoria, or right or left hyperphoria, then the usual prism methods of correction for these defects may be employed.

To accentuate the displacement of the halves of the test chart where balance exists, the quarters of the chart are divided off by two fairly broad lines 29 that cross each other at right angles as best shown in Fig. 1.

In prior devices for testing for muscular imbalance, such devices have depended wholly upon the unnatural straining of the functional powers of the extrinsic muscles of the eye and such tests are uncomfortable to the subject if continued for any length of time and instead of alleviating derangements, really intensified them, and to this extent it may be said that their use is objectionable because they measure not what the eyes will do if allowed to seek a position of physiological rest, but what they are doing under the stress of the muscles which are not functioning properly. The present device instead of producing double images, wholly retains the singleness of the test objects and the use of the present device does not tire the eyes or accentuate the malfunctioning of the muscles, but actually rests them. This is because the entity of the test chart is not interfered with and the involuntary faculties of binocular vision are not disturbed.

It will be understood that the patient may wear the usual trial frame or a trial frame may be supported on the bar 13 along with the other parts of the apparatus as in any phoropter, phoro-optometer, or similar apparatus.

While certain preferred embodiments of the invention have been illustrated and described herein, it is to be understood that the invention is not limited thereby but is susceptible of changes in form and detail within the scope of the appended claims.

I claim:

1. In a device for testing the eyes of a subject, the combination of a test chart having duplicate sets of test objects in diagonally located relation; a pair of plates; and means for mounting each plate for horizontal and vertical movement relative to said chart for occluding opposite retinal halves of the eyes of the subject whereby the unoccluded opposite retinal halves of the eyes are caused to view opposite halves of said chart.

2. In an eye-testing device, the combination of a test chart divided into quarters and having duplicate sets of test characters in diagonally opposite quarters; a carrier adapted to be fixedly interposed between the eyes tested and the chart; and two opaque shutters of substantially rectangular form; means for mounting each shutter on said carrier for horizontal and vertical movement, said shutters adapted to be adjustably spaced on opposite sides of both a horizontal and vertical line and so positioned as to allow each eye of a patient to view one-half of one set of test characters, the halves being opposite so that together they will form a true complete image if no muscular imbalance is present in the eyes.

3. In an eye-testing device, the combination of a holder; a test chart mounted on said holder, said chart being divided into fourths by a vertical and a horizontal line and being provided in diagonally opposite corners with duplicate sets of test characters; a carrier mounted on said holder and movable relative to said chart and adapted to be positioned between the chart and the eyes to be examined; two occluding plates of substantially rectangular form; means for adjustably mounting each plate on said carrier for horizontal and vertical movement, said plates being adapted to be adjusted so that they are disposed on opposite sides of both a horizontal and a vertical line and positioned so as to allow each eye to receive one-half of one set of test characters, the halves being opposite so that together they will form a true complete image if no muscular imbalance is present in the eyes.

4. In an eye-testing device, the combination of a holder; a test chart mounted on said holder, said chart being divided into fourths by a vertical and a horizontal line and being provided in diagonally opposite corners with duplicate sets of test characters; a carrier mounted on said holder and movable relative to said chart and adapted to be positioned between the chart and the eyes to be tested; a pair of arms; a pair of occluding plates, a plate being fixed to each arm; and rack and pinion means for adjustably securing said arms to said carrier whereby said plates may be adjusted relative to each other and spaced on opposite sides of both a horizontal and a vertical line and so disposed relative to each other as to allow each eye of the subject to receive one-half of one set of test characters, the halves being opposite so that together they will form a true complete image if no muscular imbalance is present in the eyes.

5. In an eye-testing device, the combination of a holder; a test chart mounted on said holder, said chart being divided into fourths by a vertical and a horizontal line and being provided in diagonally opposite corners with duplicate sets of test characters; a carrier mounted on said holder and movable relative to said chart and adapted to be positioned between the chart and the eyes to be examined; a pair of spaced vertically extending guides carried by said carrier; a pair of arms mounted for movement in said guides; a rectangular plate fixed to the upper end of each arm; a rack carried by one surface of each arm; a horizontal shaft rotatably supported by said guides; and rack-driving means fixed to said shaft and engaging the racks of said arms whereby rotation of said shaft adjusts the vertical position of said plates relative to said carrier.

6. In an eye-testing device, the combination of a holder; a test chart mounted on said holder, said chart being divided into fourths by a vertical and a horizontal line and being provided in diagonally opposite corners with duplicate sets of test characters; a carrier comprising a pair of spaced walls mounted on said holder and movable relative to said chart and adapted to be positioned between the chart and the eye of the patient; a pair of spaced vertically extending guides carried between the walls of said carrier; a pair of arms mounted for sliding movement in said guides; a rectangular plate fixed to the upper end of each arm; a rack carried by one surface of each arm; a horizontal shaft rotatably supported by said guides; rack driving means affixed to said shaft and engaging the racks of said arms whereby rotation of said shaft adjusts the vertical position of said arms and the plates carried thereby relative to said carrier; a rack slidably mounted on the inner surface of each wall, each rack having an end fixed to a guide and extending normally to said first-named rack; and means for driving said second-named rack whereby the guides are horizontally adjusted, thereby horizontally adjusting said plates relative to said carrier.

JOSEPH W. SMITH.